United States Patent [19]

Middleton, Jr. et al.

[11] 4,453,072
[45] Jun. 5, 1984

[54] WELDING METHOD AND APPARATUS SUITABLE FOR FORMING LINKS IN JEWELRY

[75] Inventors: Charles F. Middleton, Jr., Sudbury; Arthur J. Guidi, Westford, both of Mass.

[73] Assignee: Creative Fastening Methods, Inc., Wayland, Mass.

[21] Appl. No.: 333,422

[22] Filed: Dec. 22, 1981

[51] Int. Cl.³ .............................................. B23K 11/00
[52] U.S. Cl. ......................... 219/86.23; 219/86.33; 219/86.51; 219/86.41; 74/89.22; 74/110
[58] Field of Search ............... 219/86.23, 86.24, 86.25, 219/86.33, 86.51, 86.61, 86.41, 86.7, 91.1, 91.23, 151, 150 R, 160; 74/89.22, 89.21, 89.2, 110, 192; 228/173 E, 15.1, 5.1

[56] References Cited

U.S. PATENT DOCUMENTS

| | | | |
|---|---|---|---|
| 1,360,034 | 11/1920 | Senft | 219/51 |
| 1,619,837 | 3/1927 | Wenz et al. | 228/192 X |
| 1,670,699 | 5/1928 | Weed | 219/86.23 X |
| 2,354,983 | 8/1944 | Blum et al. | 219/10 |
| 2,464,752 | 3/1949 | Seeloff et al. | 219/5 |
| 2,650,977 | 9/1953 | Welch | 219/86.41 |
| 2,914,955 | 12/1959 | Colborne et al. | 74/89.22 X |
| 3,036,199 | 5/1962 | Page | 219/86 |
| 3,193,655 | 7/1965 | Kleine-Weischede | 219/51 |
| 3,390,248 | 7/1968 | Illingworth | 219/86 |
| 3,513,280 | 5/1970 | Wust | 219/52 |
| 3,629,541 | 12/1971 | Mims et al. | 219/78 |
| 3,868,489 | 2/1975 | Ayers | 219/86 |
| 3,909,575 | 9/1975 | Phares et al. | 219/50 |
| 4,075,451 | 2/1978 | Wust | 219/51 |
| 4,179,597 | 12/1979 | Bartholet | 219/56.1 |
| 4,229,637 | 10/1980 | Dederer et al. | 219/86.25 |

OTHER PUBLICATIONS

Hughes Aircraft Company Catalog, "Hughes Production Equipment".

Primary Examiner—Roy N. Envall, Jr.
Assistant Examiner—Catherine M. Sigda
Attorney, Agent, or Firm—Hamilton, Brook, Smith & Reynolds

[57] ABSTRACT

In a link forming apparatus, U-shaped links are fed into a forming station and closed by a forming anvil. Opposing electrodes are then pressed against each side of the closed link by means of a common belt drive which is in turn pneumatically driven. Each electrode is spring biased with respect to a carrier so that a predetermined spring force is applied to the link by the electrode during the welding operation. The first electrode to contact the link and apply a predetermined pressure triggers the welding current.

8 Claims, 7 Drawing Figures

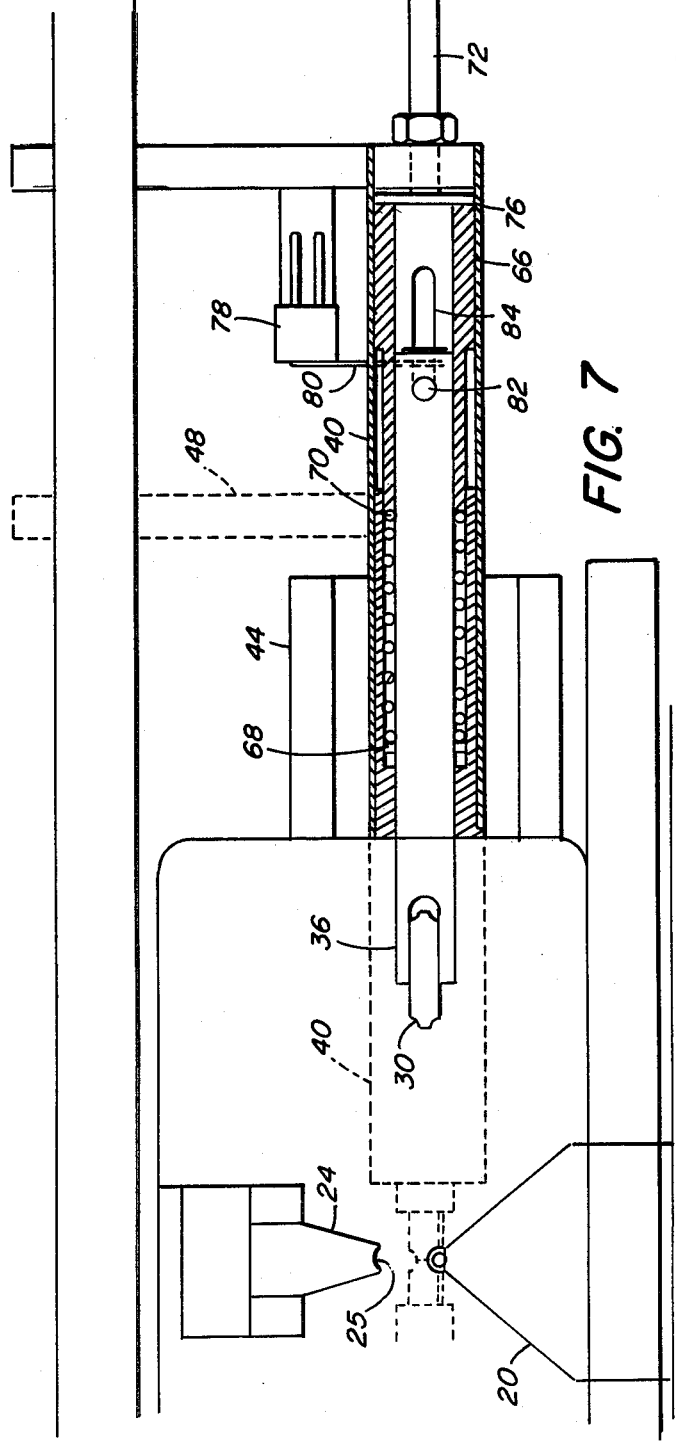
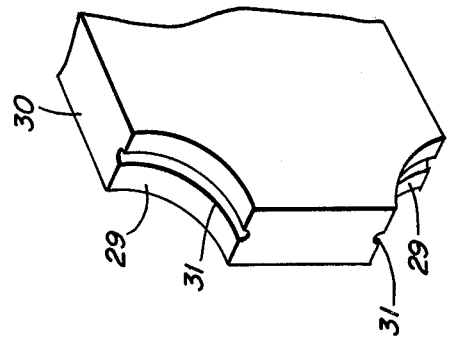
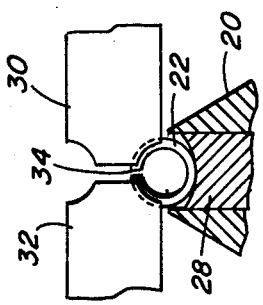
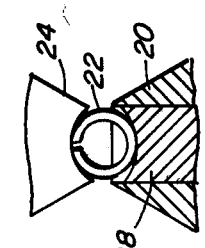
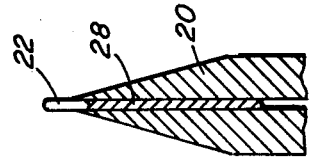
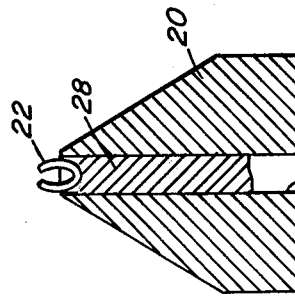

WELDING METHOD AND APPARATUS SUITABLE FOR FORMING LINKS IN JEWELRY

DESCRIPTION

1. Technical Field

This invention relates to welding apparatus and in particular to such apparatus which is suitable for welding fine links in jewelry.

2. Background

A popular form of jewelry is formed of trinkets attached to fine chain. The trinkets are joined to the chain by single links. The most common procedure for attaching a trinket to the chain includes individually feeding a U-shaped wire segment into a link forming station, manually looping a chain link and an eye on the trinket onto the open wire segment, and closing the wire segment into a closed link by means of a forming anvil. The thus formed link is then ejected by the feed mechanism.

Until recently, the wire used to form the links has been sufficiently rigid that, once formed into a closed link, no welding of the butting ends of the wire segment has been required. However, with more recent use of very fine wire to form the segments, 0.025 inch diameter wire or less, the links have required welding. To date, plasma arc welding has been found suitable for welding the delicate links. However, such welding equipment is expensive relative to both the overall link forming equipment and to less sophisticated electrical resistance welding equipment.

An object of this invention is to provide welding apparatus suitable for welding delicate links by means of the lesser expensive electrical resistance welding apparatus.

Once formed and while still held by the link feed mechanism, the wire segment forming the link may have a position tolerance such that it may be shifted off a theoretical center line of the machine by as much as 0.030 inch. Also, with small wire diameter links of 0.025 inch diameter or less, the ends of the wire forming the link must be pressed together with a precisely controlled pressure sufficient for proper welding but not so great as to cause deformation of the link. Excessive pressure against the link would result in distortion of the link, bypass of the butted ends of the wire forming the link, or complete link collapse.

A further object of this invention is to provide a welding apparatus which provide automatic welding of a delicate link with a proper welding pressure on the link even when the link is not truly centered within the link forming mechanism.

DISCLOSURE OF THE INVENTION

In a resistance welding apparatus, a workpiece is held under pressure during the welding operation by opposing rams. Both rams are positioned in ram carriers, and each is spring biased toward the other. The ram carriers are driven simultaneously toward each other to press the workpiece between the spring biased rams, and a welding current is then applied to the workpiece. With proper forging pressure applied by force mechanisms from both sides of the link and with the high temperature obtained with the welding current, the ends of the wire forming the link are forged together.

In order to position both pressing rams and electrodes against a small jewelry link, the rams which apply the pressure to the link are also the welding electrodes. Actual contact of one of the electrodes against the link with a predetermined pressure triggers the welding current.

A welding apparatus embodying this invention may be attached to a conventional link forming apparatus having a link feed mechanism and a link forming anvil. In a preferred embodiment, the electrodes are carried by a common belt drive which is in turn driven by a pneumatic cylinder. Contact of an electrode against the link with a predetermined pressure is sensed by a limit switch mounted to the electrode carrier. The first electrode to develop the predetermined pressure after contacting the link triggers the welding current. Both spring biased ram assemblies are preadjusted or calibrated to produce the same amounts of pressure of force resistance.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 2 is a front elevational sectional view of the link feed mechanism of the apparatus of FIG. 1 with an opened link positioned to receive a trinket or the like;

FIG. 3 is a side elevational sectional view of the link feed mechanism of FIG. 2;

FIG. 4 is a view similar to FIG. 2 but with a forming anvil pressed against the link to close the link;

FIG. 5 is a view similar to FIGS. 2 and 4 but with two electrodes pressing against the link from either side;

FIG. 6 is an enlarged perspective view of the end of one of the welding electrodes;

FIG. 7 is a sectional view of an electrode assembly of FIG. 1 in its nonwelding position with its welding position shown in broken lines.

PREFERRED EMBODIMENT OF THE INVENTION

Figure 1:
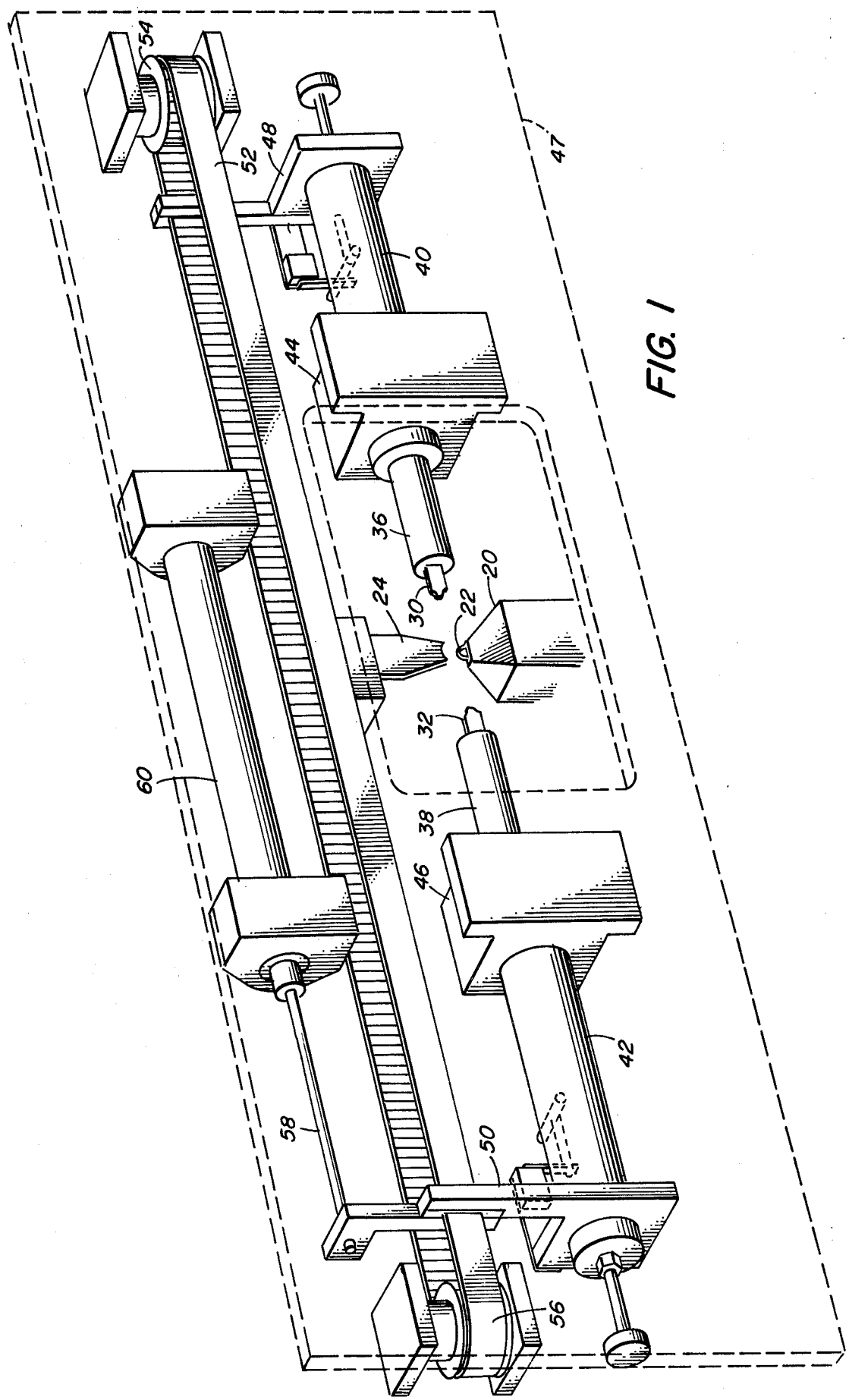
FIG. 1 is a perspective view of a welding apparatus embodying this invention mounted to a conventional link forming apparatus.

As shown in FIG. 1, a link forming apparatus, which by itself is conventional, includes a link feed mechanism 20. That mechanism positions a U-shaped wire segment, an open link, at the location shown in FIG. 1. While in that position, an operator places a trinket and chain or the like over the open ends of the link 22. A link forming anvil 24 is then moved downwardly against the open link, and its concave forming surface 25 closes the ends of the wire segment 22 so that the ends of the wire butt against each other in a closed link.

As shown in FIGS. 2-4, the wire segment 22 is moved into the forming position by a push rod 28. The push rod feeds the link up through a channel 26. As shown in FIG. 3, the channel 26 has a slight negative clearance with respect to the flat faces of the link so that the link is grasped snugly within the channel. The width of the channel as shown in FIG. 2, however, is somewhat greater than the outer diameter of the link. The position of the link within that channel has a tolerance of 0.030 inch either to the left or right as viewed in FIG.

2. Also, the link may be rotated slightly, adding further difficulty to automatic welding of the link.

FIG. 4 shows the closed link between the link forming anvil 24 and the push rod 28.

Once the link has been formed by the anvil 24, the anvil is raised. In accordance with this invention, electrodes 30 and 32 are moved into position against the link from either side as shown in FIG. 5. These electrodes also serve as pressing rams which maintain a predetermined pressure at the butting joint of the link during the welding operation. It is critical that the two electrodes abut the link on opposite sides of the joint 34 which is to be welded so that the welding current applied between the electrodes passes through that joint. The pressure applied by the electrodes on the joint must be held within a precise range in order to maintain a sufficient welding pressure yet avoid deformation of the link. This becomes increasingly critical as the size of the link and its wire diameter are decreased in size. There is an extremely sensitive balance between trying to achieve maximum welding forces and concentric, aesthetically pleasing links. The positioning of the electrodes against the link is made difficult by the fact that the link may be positioned to the left or right of the center of the apparatus by as much as 0.030 inches.

An enlarged view of the end of the electrode 30 as shown in FIG. 6. As shown, a concavity 29 is formed in each corner of the electrode, and a groove 31 is formed in each concavity. The groove has a radius which matches the radius of the wire forming the link, and the concavity has a shape which matches the shape of the closed link so that the link is seated within the groove when the electrodes are pressed toward each other.

As shown in FIG. 7, each of the four corners of the electrode 30 has a concavity so that, as the surface which butts against the link during the high voltage welding becomes worn, the electrode can be repositioned to provide a clean electrode surface.

As shown in FIGS. 1 and 7, the electrodes 30 and 32 are fixed to respective shafts 36 and 38 which extend from respective electrode carriers 40 and 42. Those carriers are movable axially on bearings such as 43 positioned within blocks 44 and 46 mounted to a front wall 47 (shown in phantom). The electrode carriers are driven by a common belt or chain drive or other transition media such as linkages. Specifically, a belt 52 is carried by pulleys 54 and 56. The pulleys are mounted to the front wall 47. The electrode carrier 40 is mounted to the rear run of the belt by a bracket 48. The electrode carrier 42 is mounted to the front run of the same belt. The bracket 50 is also fixed to a piston rod 58 of a pneumatic drive cylinder 60.

In moving the electrodes against the formed link, the piston rod 58 is retracted into the air cylinder from left to right (FIG. 1) against a return spring within the cylinder. Accordingly, the electrode 32 moves with the carrier 42 from left to right, and electrode 30 and its carrier 40 move from right to left with the rear run of the timing belt.

The two electrodes move simultaneously towards a theoretical center of the link forming mechanism. However, as discussed above, the link may not be centered exactly within that mechanism. Also, a predetermined load must be applied by the electrodes to the link to assure proper welding. To that end, as shown in FIG. 7, the electrode shaft 36 is spring biased relative to its carrier 40. Specifically, the shaft rides in front and rear bushings 64 and 66 for free axial movement relative to the carrier. A pin 62 extends through the shaft and, when the shaft is fully extended, rests against the bushing 44 to retain the shaft within the carrier 40. A washer 68 is held against the pin 62 by a compression spring 70. The spring presses against the washer and the rear bushing 66 to bias the electrode toward the link forming station.

The compression of the spring 70, and thus the force applied by that spring against a link, is controlled by an adjusting screw 72 threaded through a plug 73 at the rear end of the electrode carrier 40. The screw 72 presses against a disk 76 which in turn presses against the rear bushing 66. By adjusting the screw 72 the bushing 66 can be moved to the left to further compress spring 70.

A microswitch 78 having a sensing arm 80 is mounted by a bracket 81 to the bracket 48. A pin 82 extends from the electrode shaft 36 through a slot 84 formed in the far side of the bushing 66 and carrier 40 as viewed in FIG. 7. That pin 82 extends sufficiently beyond the carrier 40 that, as the electrode shaft is retracted into the carrier it meets the arm 80 to trigger the switch.

In adjusting the welding apparatus for automatic welding of a particular link to be formed by the equipment, each of the brackets 48 and 50 is fixed to the timing belt at a location which assures that the two electrodes fall just short of contact when driven to the center of the link forming mechanism and when no link is positioned in the forming station. The range of pressures exerted by the electrode against a link is set by the adjusting screw 72. Then, while the pressure exerted by the electrode is monitored, the electrode is retracted into the carrier. When the pressure required for proper welding is reached, the position of the microswitch 78 on its bracket 81 is adjusted so that the switch closes when that pressure is reached during operation of the system.

In operation, an open link is fed by the feed mechanism 20 into the forming and welding station. An operator positions a chain and trinket or the like on the open link and then triggers the apparatus to continue its automatic operation. At that point, the anvil 24 moves downward to close the link and is then returned to its raised position. In conventional link forming apparatus, the link would then be rejected, but in this system the link feed mechanism continues to dwell as the welding operation is carried out.

At the start of the welding operation, the air cylinder 60 retracts the piston 58 to move the two electrode carriers 40 and 42 toward the link. If, for example, the link is positioned slightly to the right of center, the electrode 30 contacts the link first and begins to retract against the force of the spring 70. The spring bias cushions the electrode as it contacts the workpiece and then maintains predetermined pressing force against the link. Once the pin 82 reaches the microswitch arm 80 and closes the switch, the force of the electrode against the link is at the predetermined welding pressure. At the same time, the left electrode will have pressed against the left side of the link and will have retracted to provide pressure from the left which is somewhat less than the pressure applied by the right electrode. Under certain conditions the ring may be repositioned or centered by the electrode ram forces and under other conditions the ring may remain off center.

Once the first of the microswitch associated with the respective electrode carriers senses that its electrode is applying the predetermined pressure, control electronics energize a high voltage input across the electrodes to provide a high welding current between the electrodes through the link. Because that welding current is triggered by the first electrode to apply the predetermined welding pressure, proper pressure applied to the link without the risk of too great a pressure is assured.

After the welding pulse, the electrodes are held against the link for a short period of time while the weld quickly cools. Then, the pneumatic drive is released and both electrode carriers are retracted by a spring return positioned in the cylinder 60. After an additional delay which assures that the electrodes are fully retracted, the link is ejected by the push rod 28.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. Welding apparatus of the type comprising electrodes for subjecting a workpiece to a welding current at a joint to be welded and pressing means for maintaining a pressing force on the workpiece through the joint while current is applied, the welding apparatus comprising:
    opposing ram carriers;
    opposing electrode rams, one electrode ram mounted to each carrier and spring biased relative to the carrier toward the other electrode ram;
    drive means for simultaneously driving opposing ram carriers toward each other to press the workpiece between the electrode rams such that each ram retracts against the spring bias to cushion the electrode ram as it contacts the workpiece and thereafter maintain predetermined pressing force against the workpiece, the electrode rams providing the sole clamping force on the workpiece through the joint to be welded;
    sensing means associated with each of the electrode rams for sensing the time at which the first of the opposing electrode rams applies a predetermined pressure against the workpiece; and
    an electrical current source for applying a welding current between the electrode rams in response to the sensing means such that welding current is applied as a predetermined clamping force is applied to the workpiece by an electrode ram.

2. Welding apparatus as claimed in claim 1 wherein the sensing means comprises a limit switch associated with each electrode carrier which is triggered by movement of the electrode relative to the electrode carrier.

3. Welding apparatus as claimed in claim 1 comprising pneumatic drive means.

4. Welding appartus as claimed in claim 1 wherein the drive means comprises a common belt or chain drive for the electrode rams.

5. In a link forming apparatus of the type having means for feeding a U-shaped wire segment to a forming station and for retaining the wire segment against lateral movement in the forming station and an anvil movable against the open end of the U-shaped wire at the forming station to close the wire into a wire link, the improvement comprising:
    opposing ram carriers;
    opposing electrode rams, one electrode ram mounted to each carrier and spring biased relative to the carrier toward the other electrode ram;
    drive means for simultaneously driving the opposing ram carriers toward each other to press the wire link between the electrode rams such that each ram retracts against the spring bias to cushion the electrode as it contacts the wire link and thereafter maintain a predetermined pressing force against the wire link, the electrode rams providing the sole clamping force on the wire link through the joint to be welded;
    sensing means associated with each of the electrode rams for sensing the time at which the first of the electrode rams presses against the wire link with a predetermined pressure; and
    an electrical current source for applying a welding current between the electrode rams in response to the sensing means such that welding current is applied as a predetermined clamping force is applied to the wire link by an electrode ram.

6. In a link forming apparatus of the type having means for feeding a U-shaped wire segment to a forming station and for retaining the wire segment against lateral movement in the forming station and an anvil moveable against the open end of the U-shaped wire at the forming station to close the wire into a wire link, the improvement comprising:
    opposing ram carriers;
    opposing electrode rams, one electrode ram mounted to each carrier and spring biased relative to the carrier toward the other electrode ram;
    a pneumatically drive belt for simultaneously driving the opposing ram carriers toward each other to press the wire link between the electrode rams such that each ram retracts against the spring bias to cushion the electrode as it contacts the wire link and thereafter maintain predetermined pressing force against the wire, the electrode rams providing the sole clamping force on the wire link through the joint to be welded;
    a limit switch associated with each electrode carrier for sensing the first contact of an electrode ram against the wire link with a predetermined pressure; and
    an electrical current source for applying a welding current between the electrode rams in response to the sensing means such that welding current is applied as a predetermined clamping force is applied to the wire link by an electrode ram.

7. A method of welding a joint in a workpiece comprising:
    positioning the workpiece generally centrally between electrode carriers and retaining the workpiece against lateral movement, each carrier supporting an electrode which is spring biased relative to the carrier toward the workpiece;
    simultaneously driving the carriers toward the workpiece such that each electrode pressed against the workpiece and retracts against its spring bias, the electrodes providing the sole clamping force on the workpiece through the joint to be welded; and
    triggering a welding current between the electrodes with a predetermined pressure buildup by either electrode against the workpiece such that welding current is applied as a predetermined clamping force is applied to the wire link by an electrode.

8. A method of forming a delicate link comprising:
    feeding a delicate U-shaped wire segment to a work station and retaining the wire segment against lateral movement;

pressing an anvil against the open end of the wire segment to close the segment into a wire link;
simultaneously driving opposing spring biased electrodes toward the wire link from each side to clamp the wire link between the electrodes; and
triggering a welding current between the electrodes when either of the electrodes applies a predetermined pressure to the wire link, the electrodes providing the sole clamping force on the wire link through the joint to be welded.

* * * * *